United States Patent [19]
Borer

[11] Patent Number: 6,057,892
[45] Date of Patent: May 2, 2000

[54] CORRELATION PROCESSING FOR MOTION ESTIMATION

[75] Inventor: Timothy J. Borer, Smallfield, United Kingdom

[73] Assignee: Innovision, PLC., Woking, United Kingdom

[21] Appl. No.: 08/983,473

[22] PCT Filed: Jul. 9, 1996

[86] PCT No.: PCT/EP96/03056

§ 371 Date: Apr. 2, 1998

§ 102(e) Date: Apr. 2, 1998

[87] PCT Pub. No.: WO97/04588

PCT Pub. Date: Feb. 6, 1997

[30] Foreign Application Priority Data

Jul. 21, 1995 [GB] United Kingdom .................. 9514992

[51] Int. Cl.[7] .................................................. H04N 7/32
[52] U.S. Cl. .......................................... 348/699; 348/416
[58] Field of Search ................................... 348/679–700, 348/416, 402, 407, 413, 431, 451; 382/236, 238; 386/111

[56] References Cited

U.S. PATENT DOCUMENTS

| | | | |
|---|---|---|---|
| 5,005,078 | 4/1991 | Gillard | 348/699 |
| 5,535,288 | 7/1996 | Chen et al. | 348/416 |
| 5,550,935 | 8/1996 | Erdem et al. | 348/241 |
| 5,621,467 | 4/1997 | Chien et al. | 348/409 |

FOREIGN PATENT DOCUMENTS 0627696  12/1994  European Pat. Off. ........ G06F 15/70
0649250   4/1995  European Pat. Off. ......... H04N 5/21

OTHER PUBLICATIONS

"Pre–and Post–Processing in a Video Terminal Using Motion Vectors" by L. Chiariglione, L. Corgnier, M. Guglielmo.

"Review of Techniques for Motion Estimation and Motion Compensation" by Eric Dubois & Janusz Konrad. Fourth International Colloquium on Advanced Television System Proceedings. Jun. 25–29, 1990.

"Motion–compensating filed interpolation from interlaced and non–interlaced grids" by B. Girod & R. Thoma. 2nd International Technical Symposium on Optical dn Electro–Optical Applied Science & Engineering. Dec. 1985.

(List continued on next page.)

*Primary Examiner*—Vu Le
*Attorney, Agent, or Firm*—Ratner & Prestia

[57] ABSTRACT

Motion correlation is a way of analyzing movement in image sequences such as television signals. The estimation of movement in television pictures is essential to enable the use of motion compensated processing techniques. These techniques yield improved quality video processing and moving image compression. Motion correlation would be used as part of a video motion estimation system. This invention describes a number of enhancements to, and a simplfied, efficient implementation of, the basic motion correlation algorithm. It is shown how to produce motion correlation surfaces co-timed with output, rather than input, pictures. It is also shown how to average power spectra to obtain improved noise performance, and hence improved accuracy, in motion correlation. Finally it is shown that separate correlation surfaces can be produced relating to 'future' and 'past' pictures.

16 Claims, 10 Drawing Sheets

OTHER PUBLICATIONS

"Motion Compensated Interpolation" by Elana Marcozzi & Stefano Tubaro. SPIE vol. 804 Advances in Image Processing (1987), pp. 61–67.

"Model–Based Motion Estimation and its Application to Restoration and Interpolation of Motion Pictures" by Dennis Michael Martinez. MIT Technical Report No. 530, Jun. 1987. pp. 1–160.

"Motion–Compensated Television Coding: Part I" by A.N. Netravali & J.D. Robbins. The Bell System Technical Journal, vol. 58, No. 3, Mar., 1979. pp. 631–670.

"Standards Conversion Using Motion Compensation" by Thomas Reuter. Signal Processing 16 (1989)pp 73–28.

"A Motion Compensated Standards Converter for Down Conversion of 1125/60.2:1 SMPTE–240M High Definition to 625/50/2:1 Video" by J.W. Richards, S.M. Keating, C.H. Gillard. pp. 568–580.

"Experience with a prototype motion compensated standards converter for down–conversion of 1125/60/2:1 SMPTE–240M high definition to 625/50/2:1 video" by JW Richards, SM Keating, NI Saunders, CW Walters.

"Advanced High–Definition 50 to 60–Hz Standards Conversion" by P Robert, M. Lamnabhi, JJ Lhuillier. SMPTE Journal, Jun. 1989. pp. 420–424.

"Television motion measurement for DATV and other applications" by GA Thomas. BBC Research Dept. Report Sep., 1987.

"Distorting the Time Axis: Motion–Compensated Image Processing in the Studio" by GA Thomas. International Broadcasting Convention, Brighton, UK, Sep. 23–27, 1988.

"Generation of high quality slow–motion replay using motion compensation" by GA Thomas & HYK Lau International Broadcasting Convention, Brighton, UK. Sep. 21–25, 1990.

"On the Computation of Motion from Sequences of Images–A Review" by J.K. Aggarwal and N. Nandhakumar. Proceedings of the IEEE, vo. 76, No. 8, Aug. 8, 1988, pp. 917–935.

"Motion Compensating Field Interpolation Using a Hierarchically Structured Displacement Estimator" by Matthias Bierling & Robert Thoma. Signal Processing, Vo. 11, No. 4, Dec., 1986, pp. 387–404.

"Television Standards Conversion" by Tim Borer. A thesis submitted for the degree of Doctor of Philosophy, Chapters 3,7, and 9.

"Motion Compensated Display Field Rate Upconversion" by T.J. Borer, M.G. Huyler & D.W. Parker. International Boradcasting Convention, Brighton, UK, Sep. 21–25, 1990.

"Review of motion analysis techniques" by JF Vega–Riveros & K. Jabbour. IEEE Proceedings, vol. 136, Pt. 1, No. 6, Dec., 1989, pp. 397–404.

CORRELATION PROCESSING FOR MOTION ESTIMATION

This Application is the U.S. national phase application of PCT international application number PCT/EP96/03056.

The invention relates to video signal processing and to an improved method of motion correlation that can be used as part of a system to measure movement in television pictures (references 1, 3, 6, 8, 19 & 21 in the appendix). Motion estimation, in television pictures, is important because it allows a range of signal processing techniques to be used that give improved performance (references 2,3,4,5,10,11, 12,13,14,15,16,18, 19 & 20.

Television signals originated by a television camera are, conventionally, interlaced. Television signals originated on film are not, fundamentally, interlaced although they are formatted on an interlaced lattice. There is potential confusion in the use of the terms 'field' and 'frame' used to describe television systems. To avoid this confusion the term 'picture' is used throughout and can be taken to mean either field or frame depending on the application.

One way in which motion estimation can be performed is as a two stage process (references 3, 4, 13, 14, 15, 16, 18 & 19). First a moving scene is analysed to determine what movements it contains. This first stage of the analysis would produce a list of several different motions that may be present in the scene. This list might contain, for example, the distinct motion of foreground and background objects. Each of the motion vectors, produced by the first stage of analysis, is then tested to determine whether it applies to any given pixel. The first stage of analysis is non-localised and it is the second stage of analysis that locates the spatial position of the different movements. This invention is concerned with the first stage of analysis.

One, conventional, way in which movement in image sequences can be analysed is by the use of cross-correlation. Cross-correlation is performed on two successive images in a sequence. The cross-correlation function is expected to have peaks at positions corresponding to displacements between the two images. With distinct foreground and background objects in an image the cross-correlation between successive images would be expected to give two peaks corresponding to the two different movements. Unfortunately the shapes of the peaks in the cross-correlation surface depend strongly on the (2 dimensional) spectrum of the image. Since the energy in image spectra is typically concentrated at low frequencies the peaks in cross-correlation surfaces are, correspondingly, typically rounded and indistinct. The rounded shape of typical cross correlation peaks makes determining the position of the centre of the peak very difficult. Therefore, motion analysis using cross correlation is very inaccurate.

Phase correlation has been used as an improved method of motion analysis (reference 4, 18 & 19). The phase correlation function is similar to cross correlation. The phase correlation function of two successive images in a sequence would also be expected to exhibit peaks in positions corresponding to movements in the image. Phase correlation, in contrast to cross correlation, uses normalised, or 'whitened' spectra prior to correlation. This gives much sharper peaks in the phase correlation surface for most images. The sharp peaks enable the displacement between two successive images to be accurately measured.

Motion correlation provides an analysis of the motion in an image sequence based on its three dimensional, spatio-temporal spectrum. The motion correlation algorithm is defined as follows. Let the brightness (or similar function of the image) be represented by g(x,y,t); where x, y & t represent the horizontal, vertical and temporal co-ordinates of the image sequence respectively.

1. Estimate the complex, 3 dimensional, image spectrum G(m,n,f) where m, n & f are horizontal, vertical and temporal frequencies respectively and F represents the Fourier transform operation.

$$G(m,n,f) = F(g(x,y,t)) \quad \text{Equation 1}$$

2. Normalise the spatio-temporal power spectrum by dividing it by the spatial power spectrum D(m,n); * represents complex conjugate.

$$N(m,n,f) = \frac{G(m,n,f) \cdot G^*(m,n,f)}{D(m,n)} \quad \text{Equation 2}$$

where; $D(m,n) = \int G(m,n,f) \cdot G^*(m,n,f) df$

3. Re-transform the normalised spatio-temporal power spectrum, N (m,n, f), to the spatio-temporal domain; $F^{-1}$ represents the inverse Fourier transform operation.

$$s(x,y,t) = F^{-1}(N(m,n,f)) \quad \text{Equation 3}$$

4. Sample the normalised image, s(x,y,t), at time $t_c$ to give a motion correlation function, c(x,y). Note that $t_c$ can be a positive or negative (not zero) integer number of picture periods.

$$c(x,y) = S(x,y,t_c) \quad \text{Equation 4}$$

For a raster scanned television image the co-ordinates would be discrete, referring to discrete pixels, lines or pictures, and Fourier transforms would be implemented using the discrete Fourier transform. Note that the original algorithm has a square root in equation 2. This seems an unnecessary and undesirable complication that is ignored in this document.

Motion correlation is intended to remove information, about the objects in a scene, from the 3-D spectrum of an image sequence, leaving only motion information. Once the information, such as the position and shape of the edges within an object, is removed the spectrum of a 'standard' moving object remains. The 'standard' object is a bright point moving through the spatial origin at time zero. Re-transforming the spectrum of this 'standard' point object (or objects), to the space and time domain, reveals its (their) motion, from which the motion of the original object(s) can be inferred.

Motion correlation is most simply explained by considering a single spatial dimension, as illustrated in FIG. 1. The (2 dimensional) spatial spectrum of an image is an alternative representation of the image. Essentially the phase part of the spatial spectrum describes the positions of edges in the image whilst the magnitude part (spatial power spectrum) describes the profile of the edges. The (3 dimensional) spatio-temporal spectrum of the image sequence contains motion information as well. In a stationary scene all the energy, in the spatio-temporal spectrum, lies at zero temporal frequency. For a moving object the energy is skewed to higher temporal frequencies as shown in FIG. 1. In motion correlation, first the phase information is removed from the spatio-temporal spectrum by calculating the spatio-temporal power spectrum: $(G(m,n,t) \cdot G^*(m,n,t)$ in equation 2). This removes information on the position of edges in the image. Then the spatial power spectrum (D(m,n) in equation 2) is calculated by summing the energy for all temporal frequencies. The spatio-temporal power spectrum is divided by the spatial power spectrum to give the normalised spatio-temporal power spectrum (equation 2). This division removes information on edge profiles in the image. All that is now left in the normalised spatio-temporal power spectrum is motion information. The motion information is recovered from the normalised spatio-temporal power spectrum by re-transforming it to the spatio-temporal domain (equation 3). This gives a moving bright point object, which passes through the spatial origin at time zero. The velocity of the point object corresponds to the velocity of the object in the original image sequence. The velocity is found by locating the point object at time tc, knowing that it passed through the origin at time zero. That is, by finding the peak or peaks in the correlation surface the original motion(s) can be inferred.

Motion correlation has a number of advantages over other correlation techniques for motion analysis of image sequences. The advantages include measuring motion rather than displacement, improved noise performance, improved measurement of multiple velocities and insensitivity to prior temporal filtering of the image sequence.

Motion correlation analysis of a sequence of images produces a measurement of velocity, not just displacement. Other correlation techniques measure displacement not velocity. If only two images are used in the analysis it is possible only to measure displacement, as is the case for both cross- and phase-correlation. If the image sequence contains consistent motion then measuring displacement also measures velocity The assumption of consistent motion, implicit in other correlation techniques, is not always true. Consider, for example, the image of two, stationary, snooker balls on a snooker table. Since the balls look identical, both cross and phase correlation will measure the displacement between the balls as well as the true zero velocity. Motion correlation, by contrast, will only measure the true zero velocity because the other 'motion' is not consistent across the sequence of images.

Motion correlation exhibits better noise performance than phase correlation, particularly at low velocities. This enables the peaks in motion correlation surfaces to be located more precisely and hence motion to be measured more accurately. The improved noise performance comes from the use of more input pictures in the analysis and the way in which spectral normalisation is performed.

Motion correlation should have improved ability to measure multiple motions in the image sequence. Multiple motions commonly arise, for example, from the independent motion of foreground and background objects in a scene. With cross and phase correlation techniques multiple movements are confused if the spatial power spectra of the two objects overlap. Independent measurement of foreground and background motion requires, at least partially, non-overlapping spectra with these other techniques. This may occur if, for example, the background contains mainly low frequencies and the foreground mainly high frequencies, but is, by no means, guaranteed. Motion correlation, by contrast, can, in principle, measure two distinct motions even if the spatial spectra of the objects completely overlap. This additional discrimination results from using more images in the analysis.

Since motion correlation measures velocity rather than displacement it is insensitive to prior temporal filtering of the image sequence. Cross and phase correlation techniques, by contrast, are easily confused by such temporal filtering. Temporal filtering may arise in the context of television systems from, for example, the use of field or frame comb decoders for decoding composite (PAL or NTSC) colour signals. Temporal filtering of a moving image sequence produces multiple images in the filtered sequence. Cross or phase correlation measures the displacement between each of the multiple images in each input image. This results in multiple, erroneous, motions being detected by these other correlation techniques, but not by motion correlation. Consider the example of an image, panning with a velocity (v) and subject to a temporal filter with a three picture aperture. The filtered output image, at time $t_c$, contains contributions from input pictures at times $t_{-1}$, $t_0$ & $t_1$. Similarly the output image at $t_1$ contains contributions from input pictures at $t_0$, $t_1$ & $t_2$. Cross or phase correlating these two filtered pictures results in correlation peaks corresponding to velocities $-v, 0, v, 2v, 3v$. Four of these five measured velocities are erroneous. Motion correlation is not subject to this problem because each of the multiple images in the filtered sequence is moving with the same velocity.

Motion correlation has been proposed as a method of motion analysis in image sequences (reference 3). It has a number of significant advantages over other techniques as described above, however, the direct implementation of the motion correlation algorithm is extremely computationally intensive. It is an object of the present invention to overcome this problem and to provide an efficient technique for motion analysis that is a significant improvement over existing techniques.

The invention provides a method of processing a plurality of consecutive pictures from a video signal for a motion estimation technique wherein a motion correlation function can be generated corresponding to an arbitrary time instant. In particular, the correlation function produced can be generated co-timed with output, rather than input pictures. This enables motion estimation to be more accurate when motion vectors are required on a different standard to the input image.

The invention also provides a method of processing a video signal comprising, for each picture, calculating complex spatio-temporal spectra of different spatial regions of a picture using a 3-D discrete fourier transform (DFT) including a temporal window function, performing a modulus squared operation to find the spatio-temporal power spectra, averaging the spatio-temporal power spectra spatially across different picture regions, normalising the average spatio-temporal power spectrum using the spatial power spectrum derived from the averaged spatio-temporal power spectra as the normalisation factor, re-transforming the normalised spatio-temporal power spectrum into the spatio-temporal domain using an inverse DFT, and temporally sub-sampling to produce a motion correlation output. The step of averaging the spatio-temporal power spectra is preferably performed on adjacent correlation regions. This gives an improved estimate of the spatio-temporal power spectrum.

The invention also provides a method of processing video signals for motion estimation comprising, for each picture, calculating the complex spatio-temporal spectra of a signal by first calculating the complex spatial spectrum of each region of the picture using a spatial discrete fourier transform (DFT) and subjecting the result to a temporal DFT including a temporal window function, averaging spatio-temporal power spectra determined from the complex spatio-temporal power spectra across different picture regions, normalising the average power spectrum, re-transforming the normalised spatio-temporal power spectrum into the spatio-temporal domain using an inverse temporal DFT and an inverse spatial DFT, and performing temporal sub-sampling between the two inverse DFTs.

The step of averaging the spatio-temporal power spectra may be implemented using, for example, transversal filters. That is, an inter-region spatial filter.

The normalisation step may use the spatial power spectra averaged across different picture regions as the normalisation factor where the spatial power spectrum is calculated in the temporal frequency domain. Alternatively, the spatial power spectra are calculated in the time domain and averaged across both different picture regions and over successive pictures to produce the normalisation factor.

The invention further provides a method of processing video signals for motion estimation comprising, for each picture, calculating the complex spatial spectra of a signal using a spatial DFT, normalising the complex spatial spectra using the spatial power spectra averaged across both different picture regions and successive pictures as the normalisation factor, calculating the normalised complex spatio-temporal spectra using a temporal DFT, averaging the normalised spatio-temporal power spectra across different picture regions, re-transforming the averaged normalised spatio-temporal power spectrum into the spatio-temporal domain by performing an inverse temporal DFT and an inverse spatial DFT, and sub-sampling the spatio-temporal power spectrum between the two inverse DFTs.

The spatial power spectra and spatio-temporal power spectra may be spatially averaged using transversal filters such as an inter-region spatial filter. The step of temporal averaging over successive pictures may be performed using a temporal transversal filter. Furthermore, the inverse temporal DFT may be performed on the normalised spatio-temporal power spectrum and the inter-region spatial filter may operate after the temporal sub-sampling and before the spatial DFT.

The forward temporal DFT preferably includes a time varying window function.

The invention also provides a method of processing video signals for motion estimation wherein the steps inclusive of the temporal DFT and the inverse temporal DFT are replaced by a temporal auto-correlation operation. The auto-correlation operation also replaces the temporal sub-sampling step. As the result produced by the auto-correlation function is only a single (temporal) value, the computational complexity is reduced. When the auto-correlation is implemented in the time domain, the time-varying window function of the substituted temporal DFT is replaced by a time varying interpolation filter.

The invention further provides a method of processing video signals comprising, for each picture, calculating the normalised complex spatial spectra for different regions of a picture, performing a temporal auto-correlation on the normalised spectrum and temporally filtering to produce a motion correlation output. The step of temporally filtering may be implemented using two separate filters one having only future pictures in its aperture the other having only past pictures in its aperture.

In the above methods, the discrete fourier transforms may be implemented using a fast fourier transform (FFT) algorithm.

The invention further provides apparatus for performing the method of the invention.

The invention will now be described in more detail and with reference to the accompanying drawings, in which.

Figure 1:
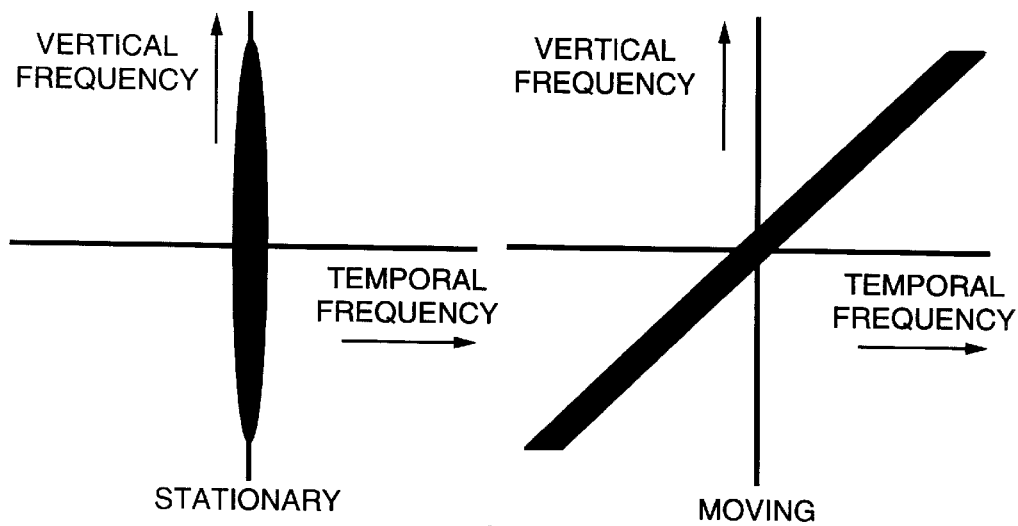
FIG. 1 shows graphically the spatio-temporal spectra of stationary and moving objects.

The basic motion correlation algorithm (described in reference 3) can be enhanced in two ways. The error in estimating the spatio-temporal power spectrum of the input image sequence can be reduced by averaging several power spectra in a technique analogous to that of periodogram averaging in one dimensional spectral estimation (reference 9). By reducing the error, in the estimated spatio-temporal power spectrum, the accuracy of the motion analysis can be improved. For some sorts of video processing, notably standards conversion, it is useful to be able to analyse the image sequence at arbitrary time instants, unrelated to times at which input pictures are sampled. Motion correlation can be modified so that a motion correlation function can be generated corresponding to an arbitrary time instant. This is not possible, by contrast, for cross or phase correlation.

Correlation analysis is often performed on parts of an image rather than the whole image. This is done to prevent the correlation being confused by the presence of too many different movements. Typically a conventional television image might be subdivided into about 100 (roughly) square regions. These regions may simply be juxtaposed to cover the entire image. The regions may also overlap so that each pixel in the original image appears in multiple correlation regions. Typically the correlation regions might overlap so that about half the pixels were common to adjacent regions horizontally and vertically. With this 2:1 overlap, both horizontally and vertically, each input pixel would appear in 4 different correlation regions.

The spatio-temporal power spectrum may be estimated by direct application of the discrete Fourier transform (as described in reference 9). It is well known that power spectral estimates derived in this way tend to be noisy (reference 9). In one dimensional spectral analysis the problem of noisy estimates is addressed by averaging several independent power spectra to reduce the noise. This is known as 'periodogram averaging'. This technique can be extended to reduce the noise in estimating the spatio-temporal power spectrum for motion correlation. If multiple correlation regions are analysed, as described above, power spectra from adjacent regions can be averaged to reduce noise. Typically one might average power spectra of the current correlation region and its eight immediately, and diagonally, adjacent regions. A weighted average of these regions might also be used with, for example, the four immediately adjacent regions being weighted half as much as the current region and the four diagonally adjacent regions weighted by one quarter. Reducing the noise in the spatio-temporal power spectrum will reduce the noise in the motion correlation surface leading to more accurate motion analysis.

The process of television standards conversion can be improved by using motion estimation. Standards conversion is the process of converting between different television standards, particularly those with different picture rates. The archetypal standards conversion is between European television with a picture rate of 50 Hz and American television with a picture rate of 60 Hz. This can be performed using motion compensated interpolation as described in references 2,3,4,7,13,14,15 & 16. For some methods of motion compensated interpolation (references 3,4,13,14,15,16 & 18) it is necessary to sample motion vectors on the output standard. It is therefore advantageous to be able to analyse motion in the input picture sequence at temporal sampling instants corresponding to output pictures. The output picture sampling instants do not, generally, correspond to input picture sampling instants and the relative timing varies with time.

In motion correlation, a sequence of input pictures are analysed so as to estimate motion. It is not reasonable to assume that the motion in television pictures remains constant for very long. One tenth of a second is a reasonable period over which to assume constant motion and this limits motion correlation to analysing only 5 or 6 conventional television pictures. With such a small number of input pictures to analyse it is important to make best use of the available information. An improved estimate of the spatio-temporal power spectrum can be achieved by multiplying the input image sequence by a, carefully selected, temporal window function. Window functions are well known in spectral estimation theory and are used to reduce bias and leakage in the estimated power spectrum and to localise the spectrum in time.

Figure 2:
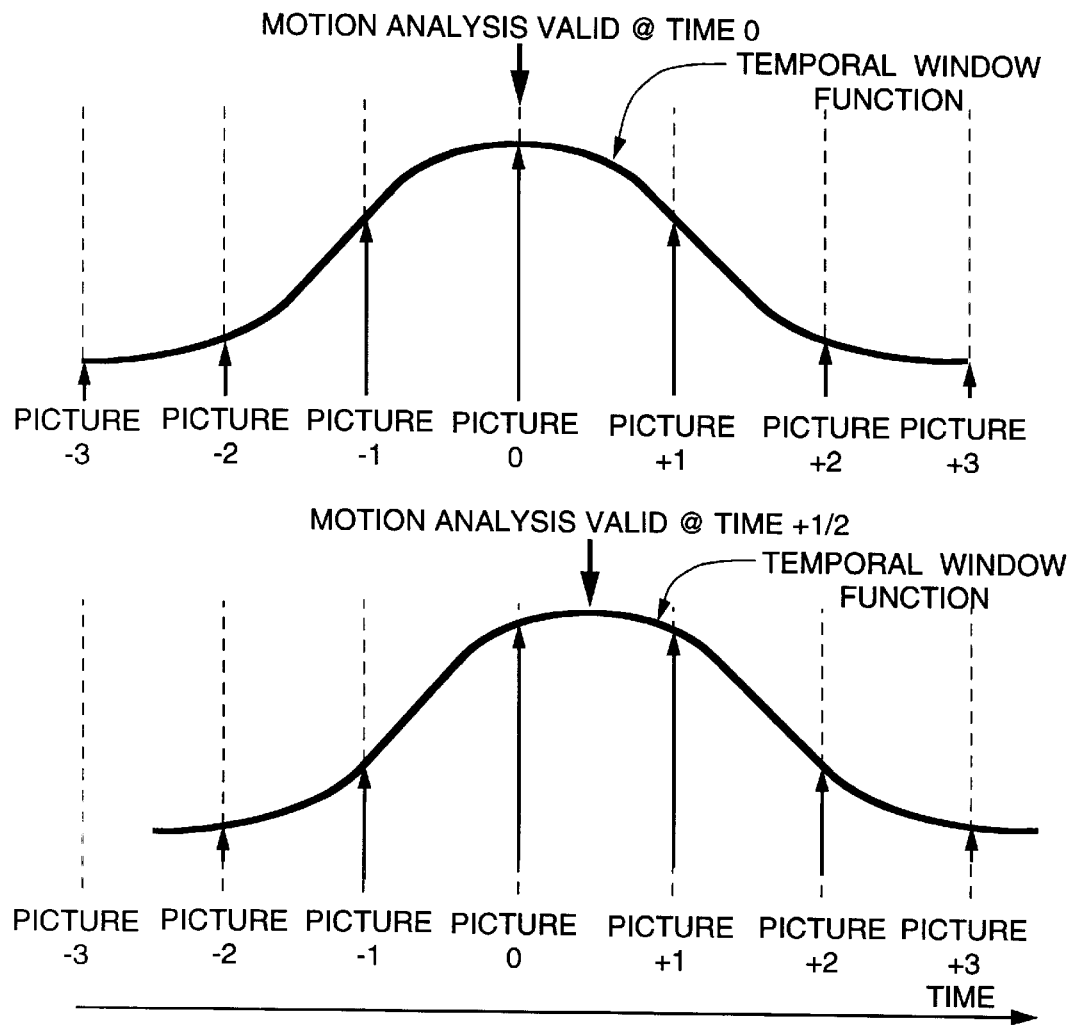
FIG. 2 shows two window functions centred differently with respect to input pictures.

The centre of the temporal window function, used in estimating the spatio-temporal power spectrum, determines the instant for which the motion correlation analysis is valid. FIG. 2 shows two window functions centred differently with respect to the input pictures. In the upper window function the resulting motion analysis is valid coincident with an input picture. In the lower window function the analysis is valid mid way between two input pictures. The precise instant for which motion correlation analysis is valid can be changed by varying the timing of the centre of the window function relative to the input pictures. This allows motion correlation analyses to be generated coincident with output, rather than input pictures in, for example, a standards converter. This, in turn, makes motion estimation more accurate where motion vectors are required on a different standard to the input images. For cross and phase correlation, by contrast, the timing of the correlation analysis is completely determined by the input picture timing and cannot be varied.

Varying the position of the temporal analysis window allows motion correlation analyses to be produced corresponding to any instant of time. The analysis, however, is still performed with respect to the input sampling lattice. This means that measuring the position of a peak in the motion correlation function will give velocity in units of input pixels (or picture lines) per input picture period.

It is noted that the spatial location of the motion correlation analysis can also be varied by adjusting the spatial centre of a spatial window function. This can be done for cross, phase and motion correlation analyses but is probably of limited utility.

Figure 3:
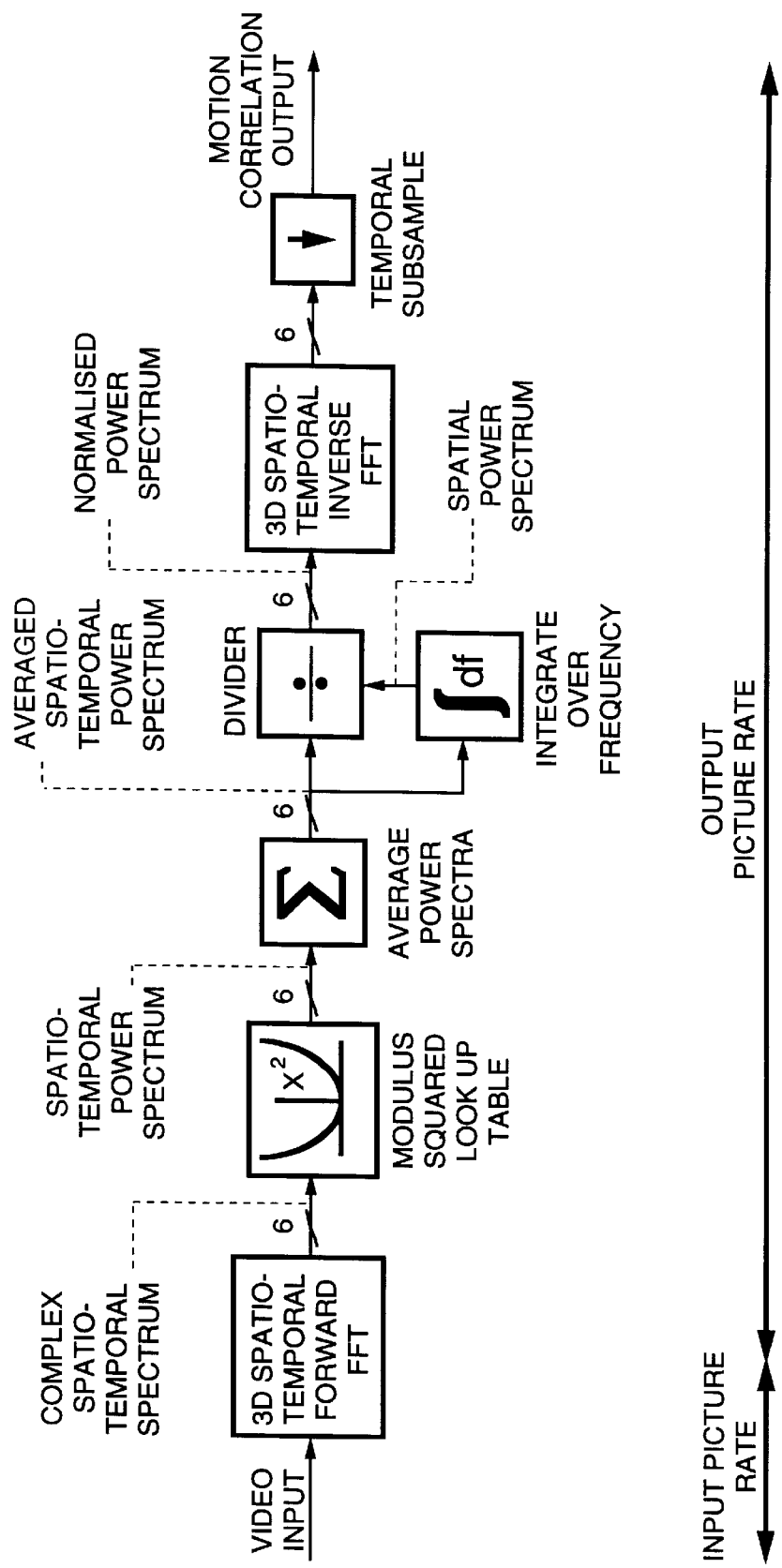
FIG. 3 shows the basic implementation of motion correlation in which the power spectra from adjacent correlation regions is averaged.

The most basic implementation of motion correlation is shown in FIG. 3. This implementation is computationally intensive and must operate on signals with a wide dynamic range. In this form, using today's technology, it is only really practicable to implement it using floating point arithmetic in a non-real time computer realisation (as described in reference 3). For practical, real time, implementation it is desirable both to simplify the algorithm and reduce the dynamic range of the signals being operated upon.

The input to the 3-D FFT, in FIG. 3, is, for example, a raster scanned video signal. The FFT includes a temporal (& spatial) window function. The temporal timing of the output motion correlation function can be varied by adjusting the temporal window function as described above. To generate motion correlation functions co-timed with output pictures, on a different television standard, requires the use of output standard timing signals to control positioning of the temporal window function used in the FFT. The FFT produces a separate, 3-D, complex spectrum for every output picture period; the output picture period may be the same as the input picture period. Typically the spectral analysis might use, say, 6 pictures. The last 6 pictures are stored within the FFT unit. For every output picture period the FFT will generate the equivalent of 6 pictures of spectral data. This is indicated as 6 signals out of the FFT unit.

Spectral analysis using 6 pictures is assumed for the rest of this document. However this is not essential and different numbers of pictures could be used in the analysis.

FIG. 3 implements equations 1 to 4 above and in addition the power spectra from adjacent correlation regions are averaged to reduce noise, as described above. The forward FFT implements equation 1. The modulus square, integrator and divider implement equation 2. The spatial power spectrum output from the integrator is D(m,n) in equation 2. Integration over frequency is achieved by simply summing the available samples of the spatio-temporal power spectrum for all frequency co-ordinates. The inverse FFT implements equation 3. Equation 4 is implemented by temporal sub-sampling, which simply discards most of the data.

Figure 4:
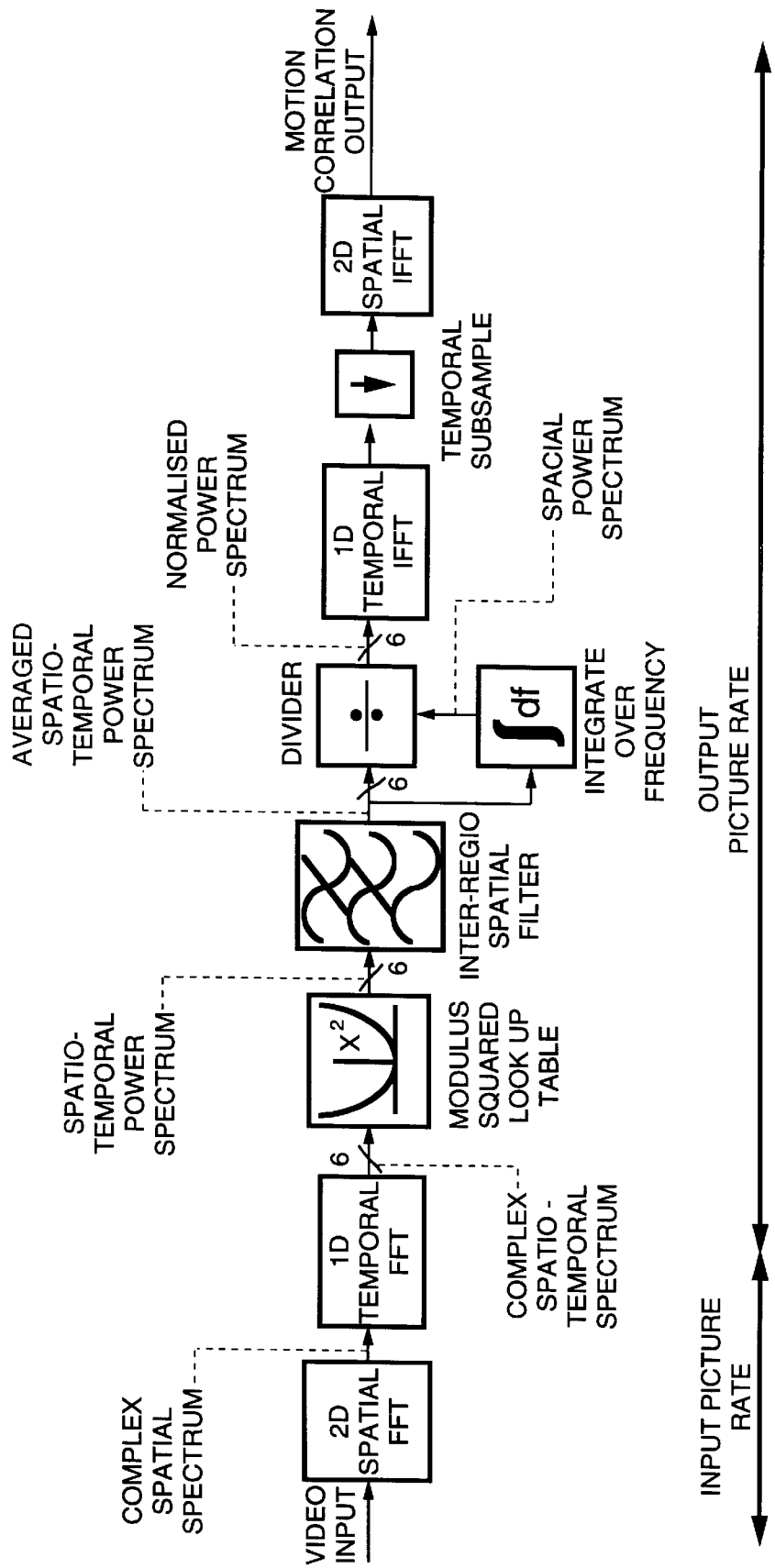
FIGS. 4 to 12 show alternative implementations of motion correlation according to the invention.

A first step in simplifying the implementation of motion correlation is to pipeline the calculation of the three dimensional discrete fourier transform as shown in FIG. 4. In FIG. 4 the results of calculating the spatial complex spectra, an intermediate step in calculating the 3-D spectrum, are reused in the calculation of multiple 3-D spectra. By retaining and reusing these results repeated, identical, calculations are avoided, thereby improving efficiency. Further efficiency improvements are achieved by re-positioning temporal sub-sampling between inverse temporal and inverse spatial Fourier transforms. This avoids the calculation of many inverse spatial transforms which would simply be discarded.

If correlation regions are juxtaposed in the original image (rather than overlapping) then the spectra of these regions can be juxtaposed in the same fashion in the intermediate processed signals. These intermediate processed signals thus constitute a 'patchwork' of spectra. With the intermediate spectra juxtaposed in this way, averaging power spectra, for noise reduction, can be achieved using a spatial transversal filter. To average adjacent correlation regions, rather than adjacent frequencies with a single correlation region, the delays in the transversal filter must be equal to the dimensions of the correlation region, rather than single pixels or lines. With suitable obvious modifications, averaging power spectra can be implemented with transversal filters even if correlation regions overlap in the original picture sequence. With this technique in mind averaging spatio-temporal power spectra is shown as a filtering operation in FIG. 4.

Figure 5:
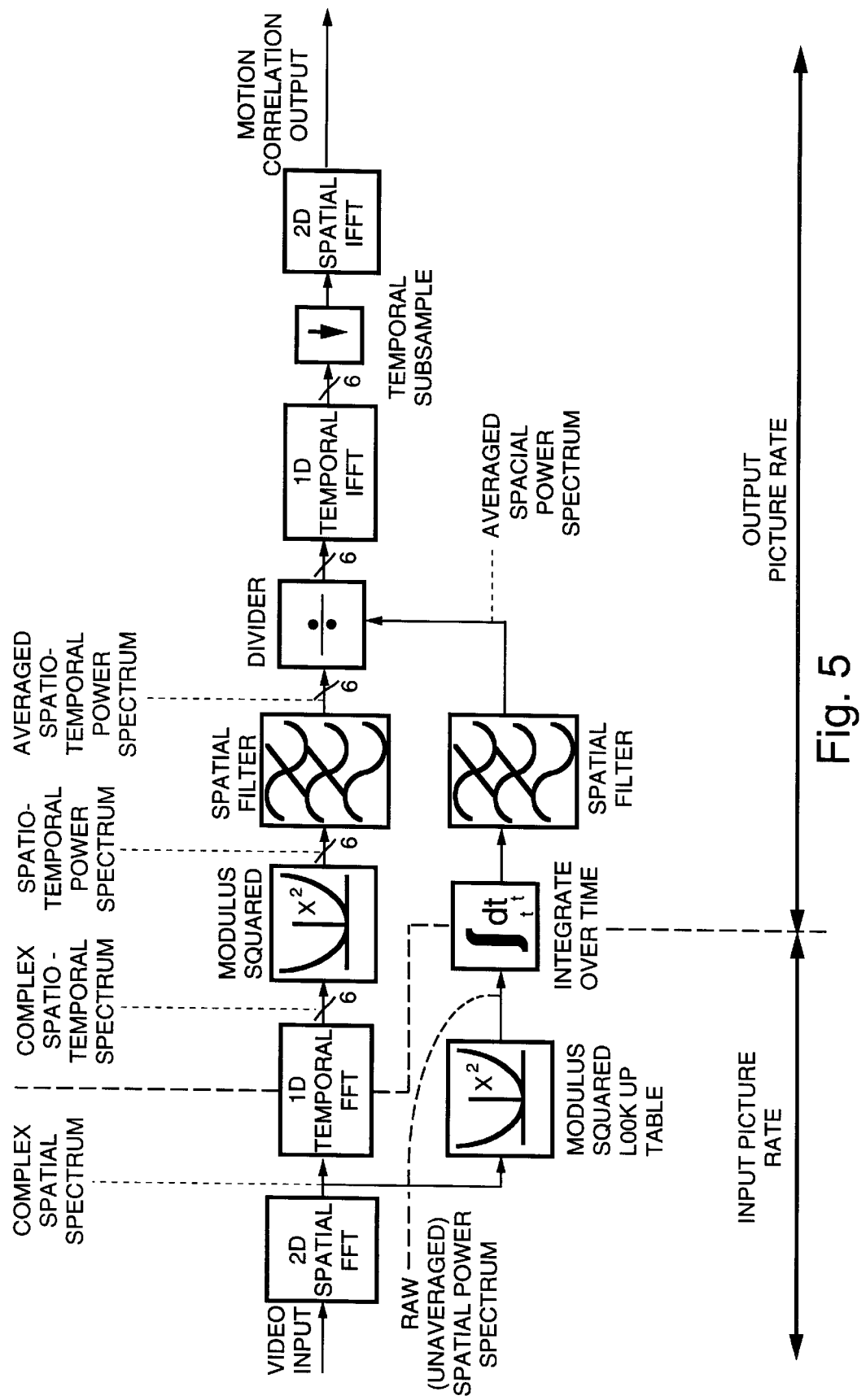

In FIGS. 3 and 4 the spatial power spectrum, used as a normalising factor, is calculated in the temporal frequency domain. Using Parseval's theorem it is also possible to calculate the spatial power spectrum in the time domain as illustrated in FIG. 5. Doing this simplifies the integration, which can now be implemented as a temporal transversal filter. Note that the filter used to integrate the 'raw' (un-averaged) spatial power spectrum must also perform an interpolation between input and output picture rates. Note also that FIG. 5 shows two spatial filters which are respectively required to average the power spectra from adjacent correlation regions.

In equation 2 the spatial power spectrum, used as a normalising factor, is given by;

$$D(m,n) = \int |G(m,n,f)|^2 \, df \qquad \text{Equation 5}$$

Using Parseval's theorem the spatial power spectrum is also given by;

$$D(m,n) = \int |F_f^{-1}(G(m,n,f))|^2 \, dt \qquad \text{Equation 6}$$

where $F_f^{-1}$ represents the inverse Fourier transform with respect to temporal frequency, f, only. This mathematical identity is implemented in FIG. 5. The implementation shown in FIG. 5 has an output mathematically identical to the basic implementation of motion correlation in FIG. 3; it is simply a more convenient implementation.

Figure 6:
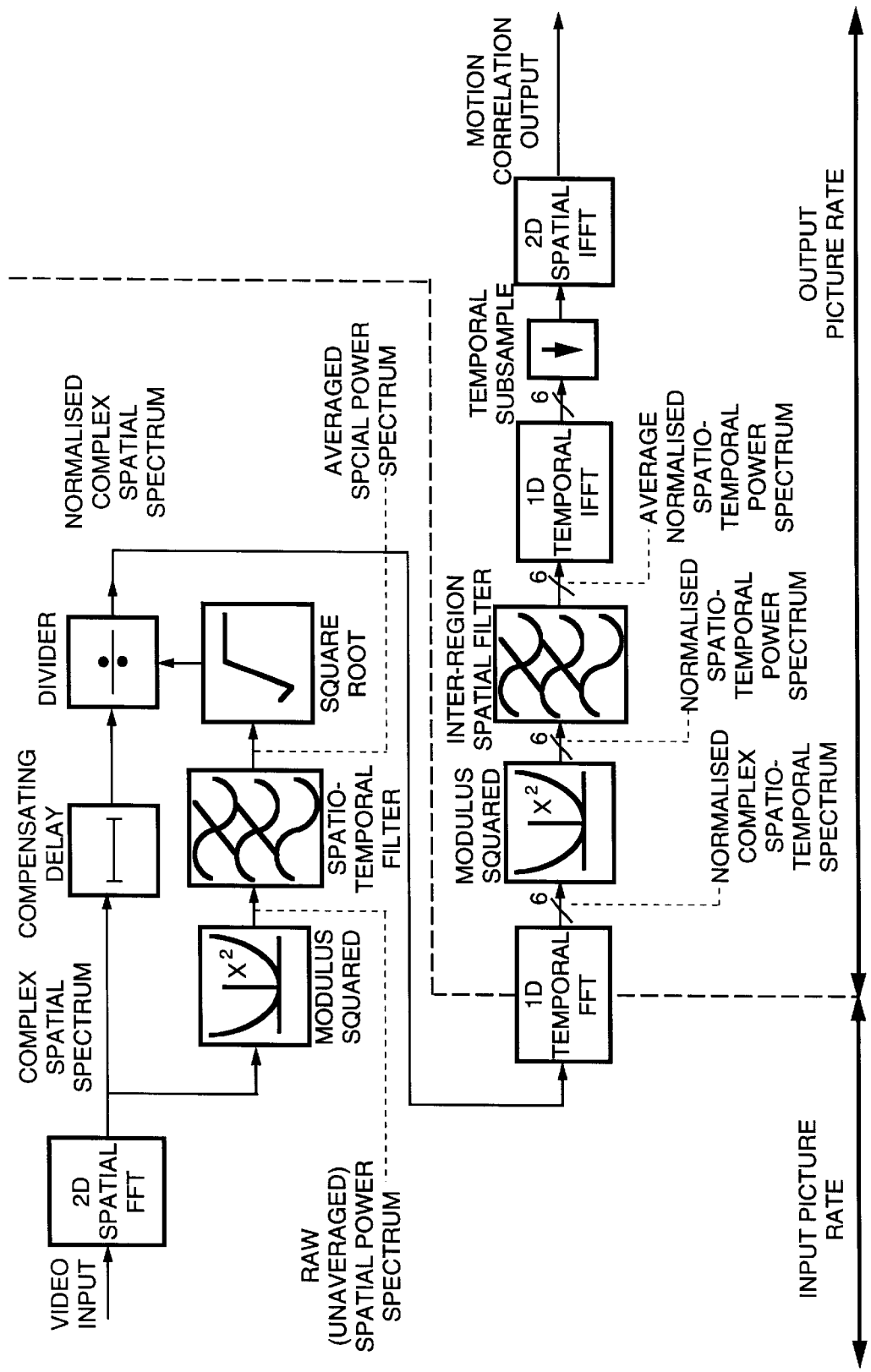

FIG. 5 is difficult to implement because of the wide dynamic range of the complex spatial spectrum input to the temporal FFT. This difficulty can be removed by re-positioning the normalisation before the temporal FFT as illustrated in FIG. 6. This change also simplifies the temporal integration because the temporal integrator is no longer required to interpolate between input and output picture rates. Hence a non-interpolating transversal filter can be used to perform temporal integration. This is combined, in FIG. 6, with the inter-region spatial filter used to average power spectra from adjacent correlation regions.

The implementations shown in FIGS. 5 and 6 result in quantitatively different motion correlation outputs. However, the temporal bandwidth of the (temporally averaged) spatial power spectrum is small because the temporal integrator acts as a low pass filter. Thus the modified correlation surface produced by FIG. 6 is regarded as qualitatively similar to the motion correlation function defined in equations 1 to 4.

Figure 7:
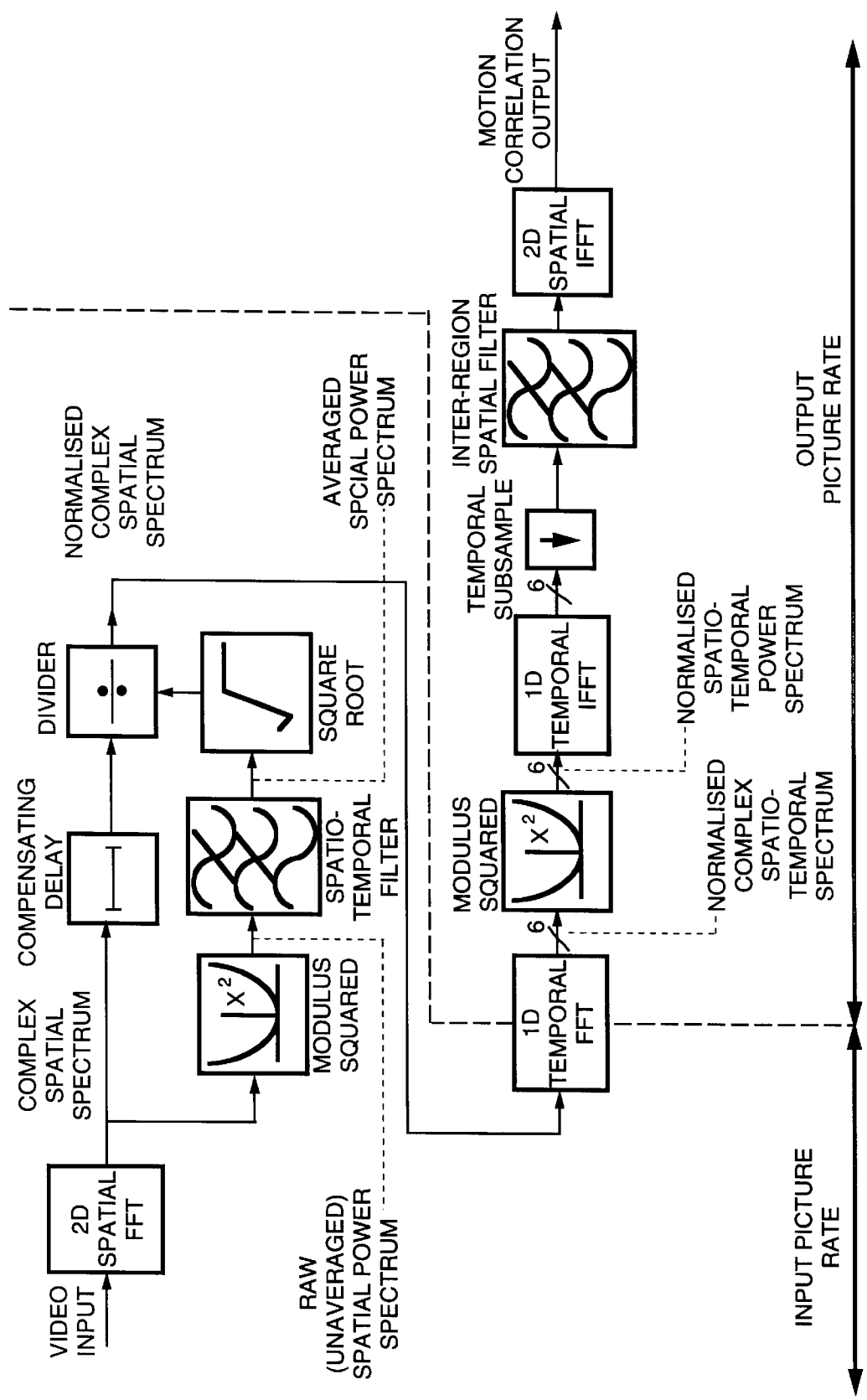

Having moved the point at which normalisation is performed in the processing chain, further simplifications are possible. The inter-region spatial filter, used for averaging normalised spatio-temporal power spectral in adjacent correlation regions, is a purely spatial operation. Therefore it is commutative with the purely temporal operations of the temporal inverse FFT and temporal sub-sampling. Hence spatial filtering can be performed after temporal sub-sampling, as shown in FIG. 7, without affecting the motion correlation output. This reduces computational complexity because now the spatial filter is only required to operate on a single stream of data rather than the many in FIG. 6. If six pictures are used in motion correlation analysis then this change saves ⅚ of the hardware required for the inter-region spatial filter.

Figure 8:
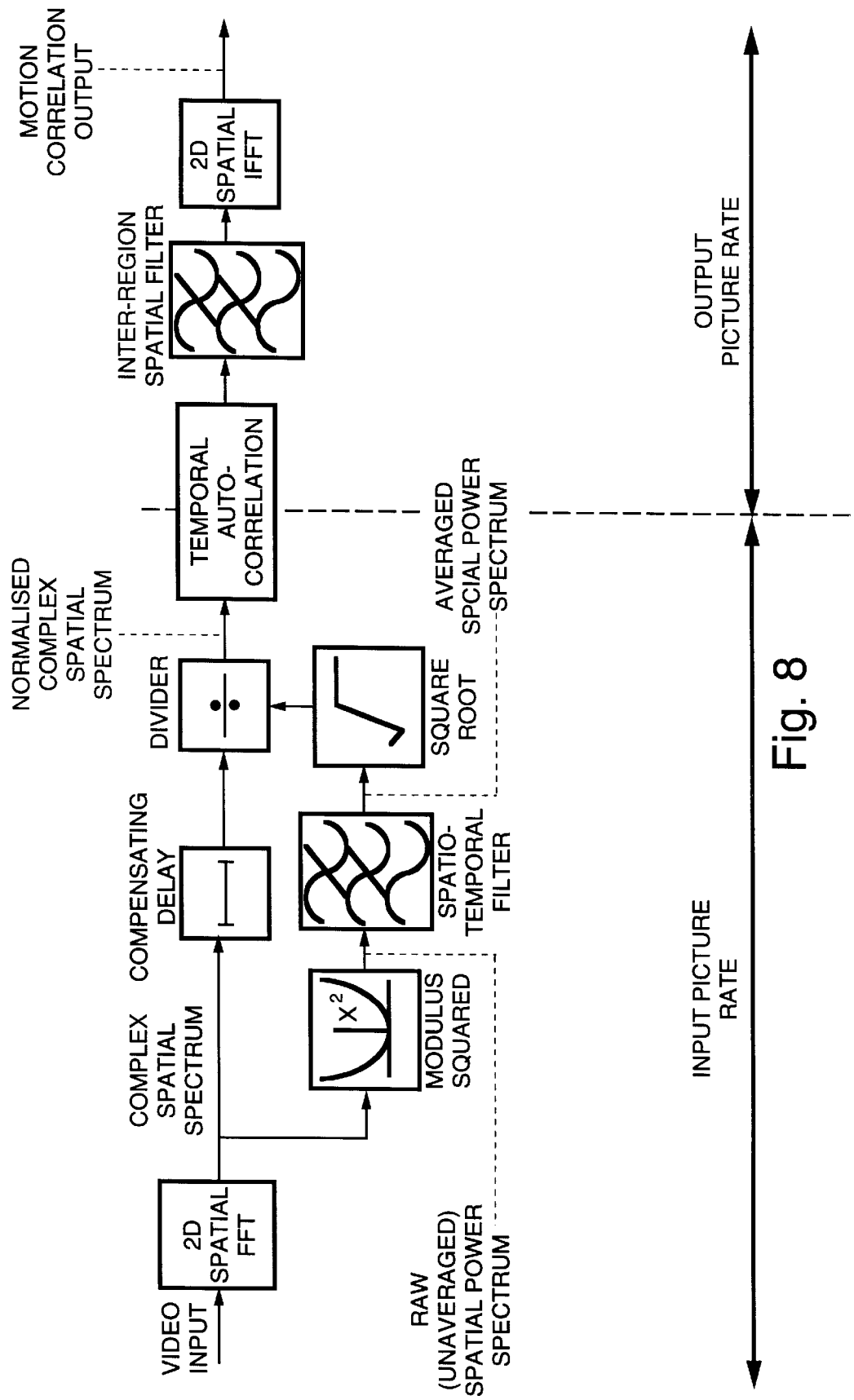

In FIG. 7 there are a forward Fourier transform, modulus squared operation and inverse Fourier transform next to each other. The juxtaposition of these three operations is equivalent to an auto-correlation. Furthermore these three operations produce the complete auto-correlation function. Motion correlation, however, only requires a single sample of the auto-correlation function, which is selected by the sub-sampling operation. Hence all four operations in FIG. 7 can be replaced by a correlation operation that produces only a single (temporal) value of the auto-correlation function, as shown in FIG. 8. This gives a significant reduction in computational complexity.

Figure 9:
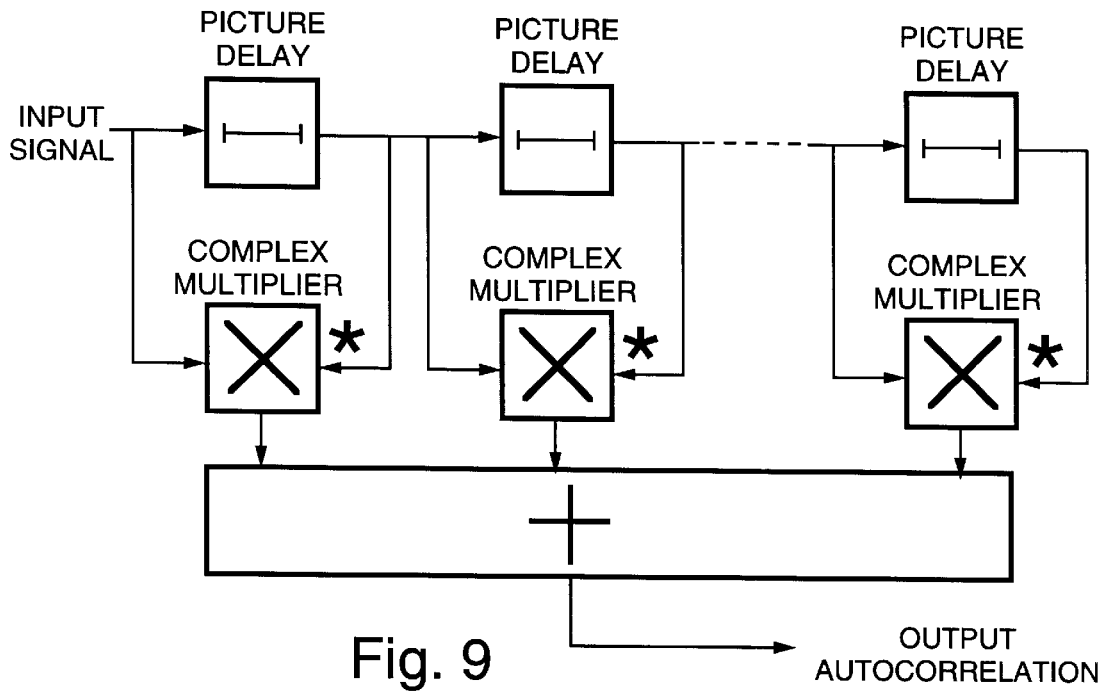

The auto-correlation in FIG. 7, implemented using FFTs, is actually a cyclic auto-correlation. A cyclic correlation assumes a periodic extension of the signal being correlated. It is both more appropriate and easier to implement a true auto-correlation as shown in FIG. 9. In each stage of the process in FIG. 9. the normalised complex spatial spectrum is multiplied by the complex conjugate:of the preceding spectrum; where the * symbol, in FIG. 9, represents the complex conjugate operation. Note that, in principle, the auto-correlation can contain an arbitrary number of stages; 6 stages are required to analyse 6 input pictures. The results from each stage are summed to give the auto-correlation output. This modification results in a further modification of the motion correlation output. This modification is believed to be beneficial rather than detrimental.

Figure 10:
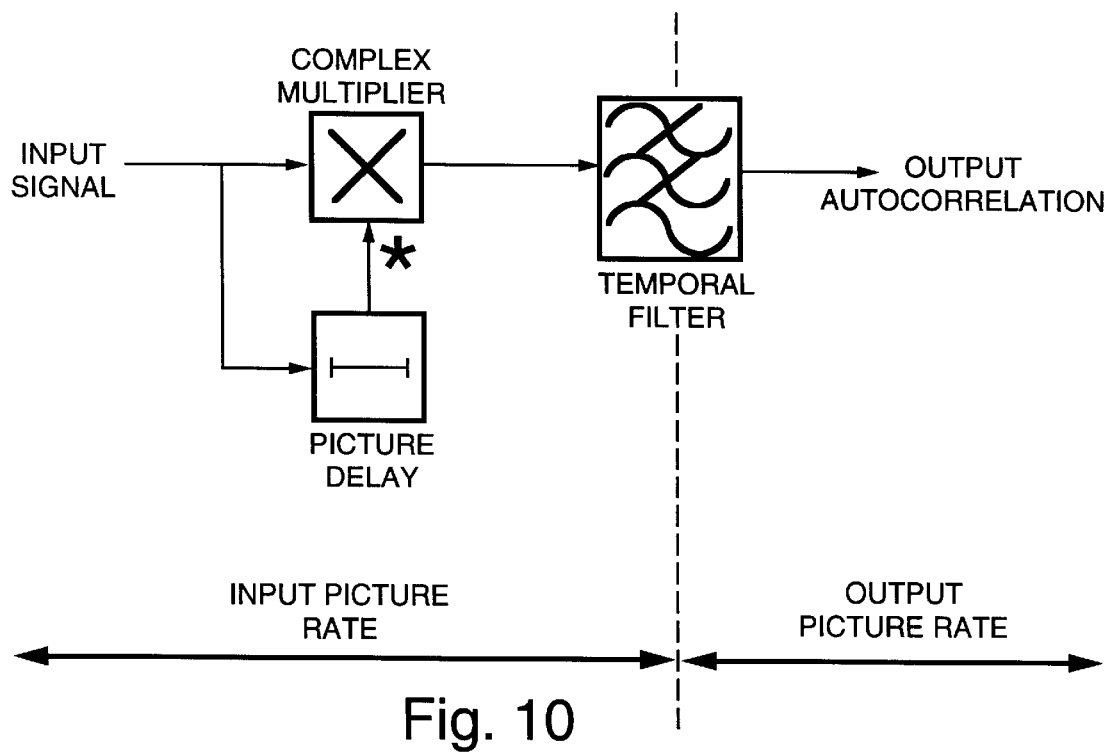

A more convenient, but equivalent, implementation of the auto-correlation is shown in FIG. 10.

The first temporal Fourier transform, in FIG. 7, includes the temporal window function, which determines the time at which the motion correlation analysis applies. The position of the centre of the window varies with the relative timing of input and output pictures as described above. When the auto-correlation is implemented in the time domain, as illustrated in FIG. 8, the time-varying window function is replaced by a time varying temporal interpolation filter, as shown in FIG. 10. In FIG. 10 the picture delay is an input picture delay. The filter averages the multiplier output over time to generate the required auto-correlation value. It also changes the temporal sampling rate of the auto-correlation value from the input picture rate to the output rate.

Figure 11:
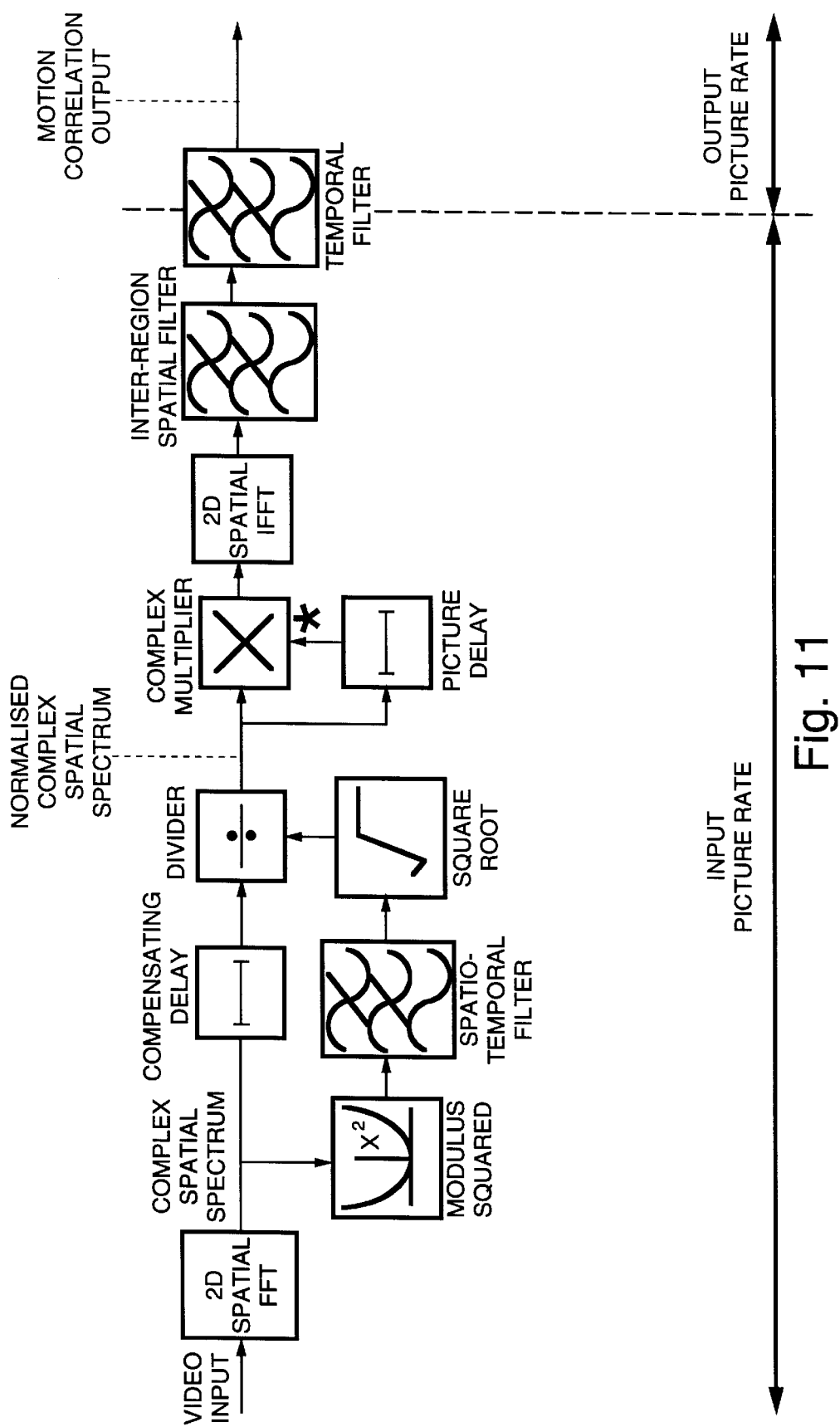

Once motion correlation is implemented using time domain auto-correlation, as in FIG. 8, the method can be further modified by re-positioning filters in the signal processing chain. In FIG. 8 a temporal interpolation filter (implicit in FIG. 8 and explicit in FIG. 10) and an inter-region spatial filter precede the spatial inverse Fourier transform. These filters may be re-positioned after the Fourier transform because all these operations are linear operations and, hence, commutative. This is shown in FIG. 11. Moving the filters results in reduced computational complexity since the filters now operate on real, rather than complex, signals. This reduces the filter complexity by, approximately, a factor of four.

FIG. 11 is a computationally less intensive implementation of motion correlation and results in a modification to the motion correlation output given by equations 1 to 4 due to the above described modifications.

The implementation of FIG. 11 leads to a further enhancement of the motion correlation method. In motion compensated image processing, to which end this invention is directed, the treatment of revealed and concealed background is important. Revealed background is only present in 'future' pictures, whereas concealed background is only present in 'past' pictures (reference 17). If a motion estimation system is required to consider revealed background then it is useful if the motion analysis considers only 'future' pictures. Performing such a 'forward' analysis ensures that the analysis is not confused by concealed background. Similarly a 'backward' motion analysis, considering only 'past' pictures, is useful for concealed background.

Figure 12:
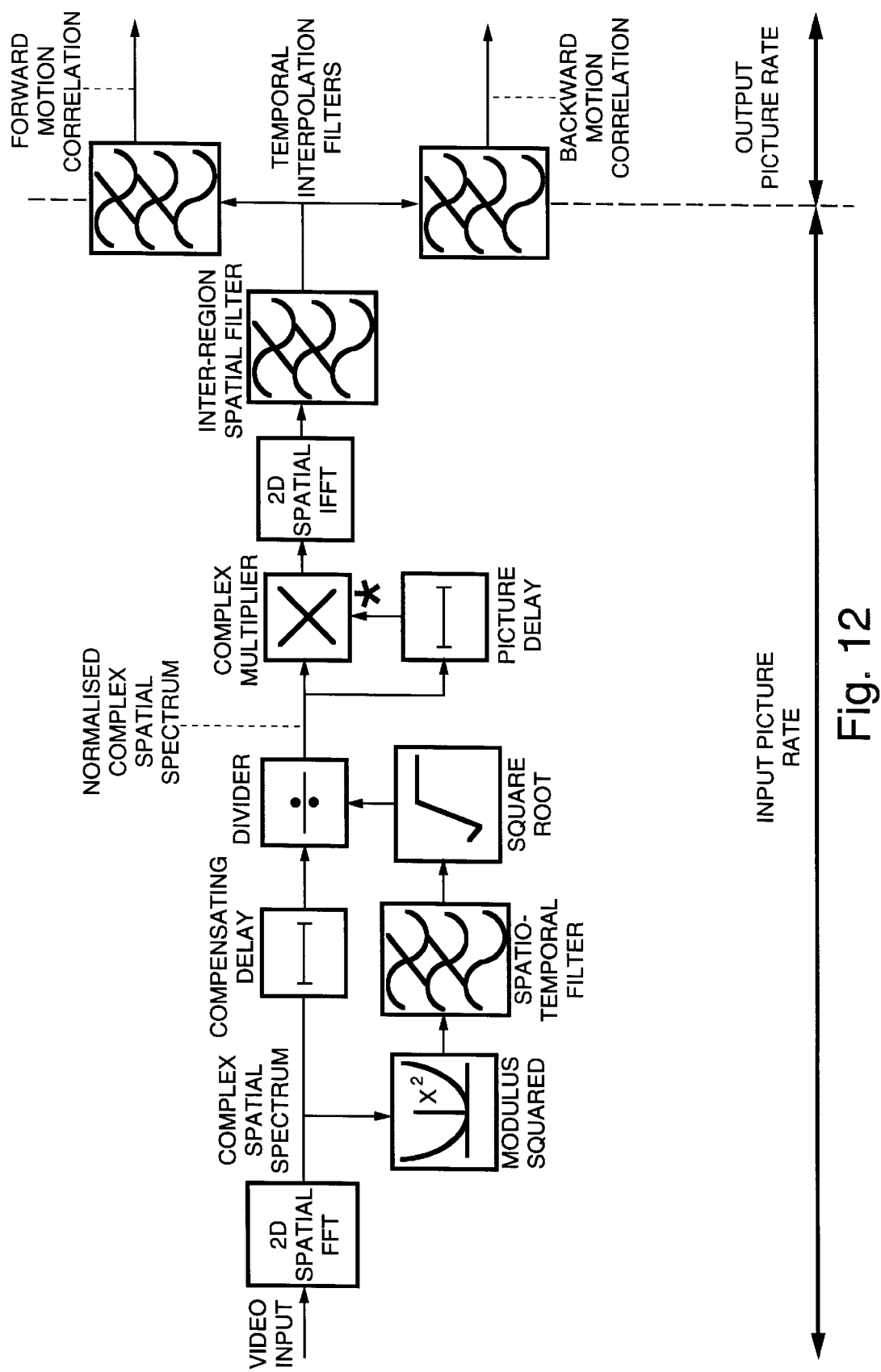

The simplified implementation of motion correlation, in FIG. 11, can be modified to provide separate forward and backward motion correlation analyses, as shown in FIG. 12. To do this the temporal interpolation filter of FIG. 11 is split into two temporal halves. One half contains only 'future' pictures in its aperture and generates a forward motion correlation surface. The other half contains only 'past' pictures in its aperture and generates a backward motion correlation surface. The full motion correlation surface, as generated by FIG. 11, could be recovered by simply summing the forward and backward correlation surfaces. This modification could be of considerable advantage in motion estimation for processing revealed and concealed background. Separate forward and backward correlation surfaces might prove particularly advantageous when processing a 'cut' in a video sequence.

This invention is an enhanced motion correlation technique and an efficient method for its implementation. Motion correlation is a technique for analysing the motion of one or more objects in an image sequence. It might form part of a system for estimating motion in television pictures. Once television motion has been estimated the motion vectors can be used to implement improved video processing algorithms.

This invention presents several enhancements to the original motion correlation algorithm published in reference 3. It is shown how to produce motion correlation surfaces co-timed with output, rather than input, pictures. This might be particularly advantageous in a television standards converter system. It is also shown how to average power spectra to obtain improved noise performance, and hence improved accuracy, in motion correlation. Finally it is shown that separate correlation surfaces can be produced relating to 'future' and 'past' pictures. This may be helpful in processing areas of concealed and revealed background in image sequences.

An efficient implementation of motion correlation is presented in FIGS. 11 and 12. This implementation was developed, in a series of stages, from the basic implementation shown in FIG. 3. The basic implementation of FIG. 3 is only really practicable for non-real time implementation using a floating point data format. In other words FIG. 3 is only suitable for use in a computer simulation. FIG. 11, by contrast can readily be implemented in real time using easily available commercial semiconductor technology. Minor modifications are required to the basic motion correlation algorithm in order to effect this simplification. These changes do not result in a qualitative degradation in the output correlation surfaces.

I claim:

1. A method of processing a plurality of consecutive pictures from a video signal for a motion estimation technique comprising, for each picture, calculating complex spatio-temporal spectra of different spatial regions of a picture using a 3-D discrete Fourier transform (DFT) including a temporal window function, performing a modulus squared operation to find the spatio-temporal power spectra, averaging the spatio-temporal power spectra spatially across different picture regions, normalizing the average spatio-temporal power spectrum using the spatial power spectrum derived from the averaged spatio-temporal power spectra as the normalization factor, re-transforming the normalized spatio-temporal power spectrum into the spatio-temporal domain using an inverse DFT, and temporally sub-sampling to produce a motion correlation output, wherein a motion correlation function is generated corresponding to a predetermined time instant by applying said temporal window function in the calculation of the spatio-temporal power spectrum.

2. A method of processing a video signal as claimed in claim 1, wherein the step of averaging the spatio-temporal power spectra is preferably performed on adjacent correlation regions.

3. A method of processing a plurality of consecutive pictures from a video signal for a motion estimation technique comprising, for each picture, calculating the complex spatio-temporal spectra of a signal by first calculating the complex spatial spectrum of each region of the picture using a spatial DFT and subjecting the result to a temporal DFT including a temporal window function, averaging spatio-temporal power spectra determined from the complex spatio-temporal power spectra across different picture regions, normalizing the average power spectrum, re-transforming the normalized spatio-temporal power spectrum into the spatio-temporal domain using an inverse temporal DFT and an inverse spatial DFT, and performing temporal sub-sampling between the two inverse DFTs wherein a motion correlation function is generated corresponding to a predetermined time instant by applying said temporal window function in the calculation of the spatio-temporal power spectrum.

4. A method of processing video signals as claimed in claim 3, wherein the step of averaging the spatio-temporal power spectra is implemented using transversal filters.

5. A method of processing video signals as claimed in claim 3, wherein the spatial power spectrum is calculated in the temporal frequency domain and the spatial power spectra averaged across different picture regions is used as the normalization factor.

6. A method of processing video signals as claimed in claim 3, wherein the spatial power spectra are calculated in the time domain and averaged across both different picture regions and over successive pictures to produce the normalization factor.

7. A method of processing video signals for motion estimation comprising, for each picture, calculating the complex spatial spectra of a signal using a spatial DFT, normalizing the complex spatial spectra using the spatial power spectra averaged across both different picture regions and successive pictures as the normalization factor, calculating the normalized complex spatio-temporal spectra using a temporal DFT, averaging the normalized spatio-temporal power spectra across different picture regions, re-transforming the averaged normalized spatio-temporal power spectrum into the spatio-temporal domain by performing an inverse temporal DFT and an inverse spatial DFT, and sub-sampling the spatio-temporal power spectrum between the two inverse DFTs.

8. A method of processing video signals as claimed in claim 7, wherein the spatial power spectra and spatio-temporal power spectra are spatially averaged using transversal filters.

9. A method of processing video signals as claimed in claim 7, wherein the step of temporal averaging over successive pictures is performed using a temporal transversal filter.

10. A method of processing video signals as clamed in claim 7, wherein the inverse temporal DFT is performed on the normalized spatio-temporal power spectrum and the inter-region spatial filter operates after the temporal sub-sampling and before the spatial DFT.

11. A method of processing video signals as claimed in claim 10, wherein the steps inclusive of the temporal DFT and the inverse temporal DFT are replaced by a temporal auto-correlation operation.

12. A method of processing video signals as claimed in claim 11, wherein the auto-correlation operation also replaces the temporal sub-sampling step.

13. A method of processing video signals as claimed in claim 11, wherein the auto-correlation is implemented in the time domain and the time-varying window function of the substituted temporal DFT is replaced by a time varying interpolation filter.

14. A method of processing video signals as claimed in claim 7, wherein the forward temporal DFT includes a time varying window function.

15. A method of processing video signals comprising, for each picture, calculating the normalized complex spatial spectra for different regions of a picture, performing a temporal auto-correlation on the normalized spectrum, spatially filtering using an inter-region spatial filter, and temporally filtering to produce a motion correlation output.

16. A method of processing video signals as claimed in claim 15, wherein the step of temporally filtering is implemented using two separate filters one having only future pictures in its aperture the other having only past pictures in its aperture.

* * * * *